United States Patent
Munaoka et al.

(10) Patent No.: US 10,569,649 B2
(45) Date of Patent: Feb. 25, 2020

(54) IN-VEHICLE CONTROL APPARATUS

(71) Applicant: DENSO CORPORATION, Kariya, Aichi-pref. (JP)

(72) Inventors: Yutaka Munaoka, Kariya (JP); Hiroto Banno, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/325,749

(22) PCT Filed: Jul. 16, 2015

(86) PCT No.: PCT/JP2015/003600
§ 371 (c)(1),
(2) Date: Jan. 12, 2017

(87) PCT Pub. No.: WO2016/027411
PCT Pub. Date: Feb. 25, 2016

(65) Prior Publication Data
US 2017/0158054 A1    Jun. 8, 2017

(30) Foreign Application Priority Data
Aug. 22, 2014 (JP) ................. 2014-169541

(51) Int. Cl.
*B60K 28/06* (2006.01)
*B60N 2/00* (2006.01)
(Continued)

(52) U.S. Cl.
CPC ............ *B60K 28/066* (2013.01); *B60N 2/002* (2013.01); *B60Q 1/46* (2013.01); *B60Q 1/525* (2013.01);
(Continued)

(58) Field of Classification Search
CPC .................. A61B 5/18; A61B 5/165
(Continued)

(56) References Cited

U.S. PATENT DOCUMENTS

2004/0017106 A1* 1/2004 Aizawa ................ B60T 7/12
303/191
2004/0080422 A1* 4/2004 Oyama ................ G08B 21/06
340/576
(Continued)

FOREIGN PATENT DOCUMENTS

| JP | H10217803 A | 8/1998 |
|---|---|---|
| JP | 2003-081038 A | 3/2003 |

(Continued)

*Primary Examiner* — Khoi H Tran
*Assistant Examiner* — Rodney P King
(74) *Attorney, Agent, or Firm* — Harness, Dickey & Pierce, P.L.C.

(57) ABSTRACT

An in-vehicle control apparatus performs a hazard avoidance process. The in-vehicle control apparatus includes an anomaly determination section, an alarm control section, and a hazard avoidance control section. The anomaly determination section determines whether a driver is under driving inability state during travel of the vehicle, based on information on monitoring of state of the driver. The alarm control section activates an alarm annunciator to issue an alarm outwardly from the vehicle when the driver is determined to be under driving inability state. After the alarm annunciator starts the alarm, the hazard avoidance control section fails to perform the hazard avoidance process when the alarm is stopped by a manipulation of the driver and performs the hazard avoidance process when a specified time elapses under state where the alarm is not stopped since the starting of the alarm.

8 Claims, 7 Drawing Sheets

(51) Int. Cl.
    *G08B 21/02*     (2006.01)
    *B60W 30/09*     (2012.01)
    *B60W 40/08*     (2012.01)
    *G08G 1/16*     (2006.01)
    *B60Q 1/46*     (2006.01)
    *B60R 22/48*     (2006.01)
    *B60Q 5/00*     (2006.01)
    *B60Q 9/00*     (2006.01)
    *B60Q 1/52*     (2006.01)

(52) U.S. Cl.
    CPC ............ *B60Q 5/005* (2013.01); *B60Q 9/008* (2013.01); *B60R 22/48* (2013.01); *B60W 30/09* (2013.01); *B60W 40/08* (2013.01); *G08B 21/02* (2013.01); *G08G 1/16* (2013.01); *B60R 2022/4825* (2013.01); *B60W 2040/0818* (2013.01); *B60W 2520/10* (2013.01); *B60W 2540/04* (2013.01)

(58) Field of Classification Search
    USPC .......................................................... 701/41
    See application file for complete search history.

(56) References Cited

U.S. PATENT DOCUMENTS

| | | | | |
|---|---|---|---|---|
| 2006/0208169 | A1* | 9/2006 | Breed | B60N 2/002 250/221 |
| 2010/0073194 | A1* | 3/2010 | Ghazarian | G08G 1/017 340/901 |
| 2010/0295707 | A1* | 11/2010 | Bennie | B60W 40/09 340/988 |
| 2012/0212353 | A1 | 8/2012 | Fung et al. | |
| 2012/0286957 | A1* | 11/2012 | Frechette | A61B 5/18 340/575 |
| 2013/0226408 | A1 | 8/2013 | Fung et al. | |
| 2013/0245886 | A1 | 9/2013 | Fung et al. | |
| 2014/0309881 | A1 | 10/2014 | Fung et al. | |
| 2014/0371984 | A1 | 12/2014 | Fung et al. | |
| 2015/0203126 | A1 | 7/2015 | Kobana et al. | |
| 2016/0031479 | A1 | 2/2016 | Fung et al. | |
| 2016/0107653 | A1 | 4/2016 | Fung et al. | |
| 2016/0152233 | A1 | 6/2016 | Fung et al. | |
| 2018/0072310 | A1 | 3/2018 | Fung et al. | |
| 2018/0105180 | A1 | 4/2018 | Fung et al. | |

FOREIGN PATENT DOCUMENTS

| | | |
|---|---|---|
| JP | 2003-118423 A | 4/2003 |
| JP | 2012254745 A | 12/2012 |
| JP | 2014021767 A | 2/2014 |
| JP | 2014044707 A | 3/2014 |
| JP | 2014-511301 A | 5/2014 |
| JP | 2014091380 A | 5/2014 |
| KR | 20130061901 A | 6/2013 |
| WO | WO-2014016911 A1 | 1/2014 |

\* cited by examiner

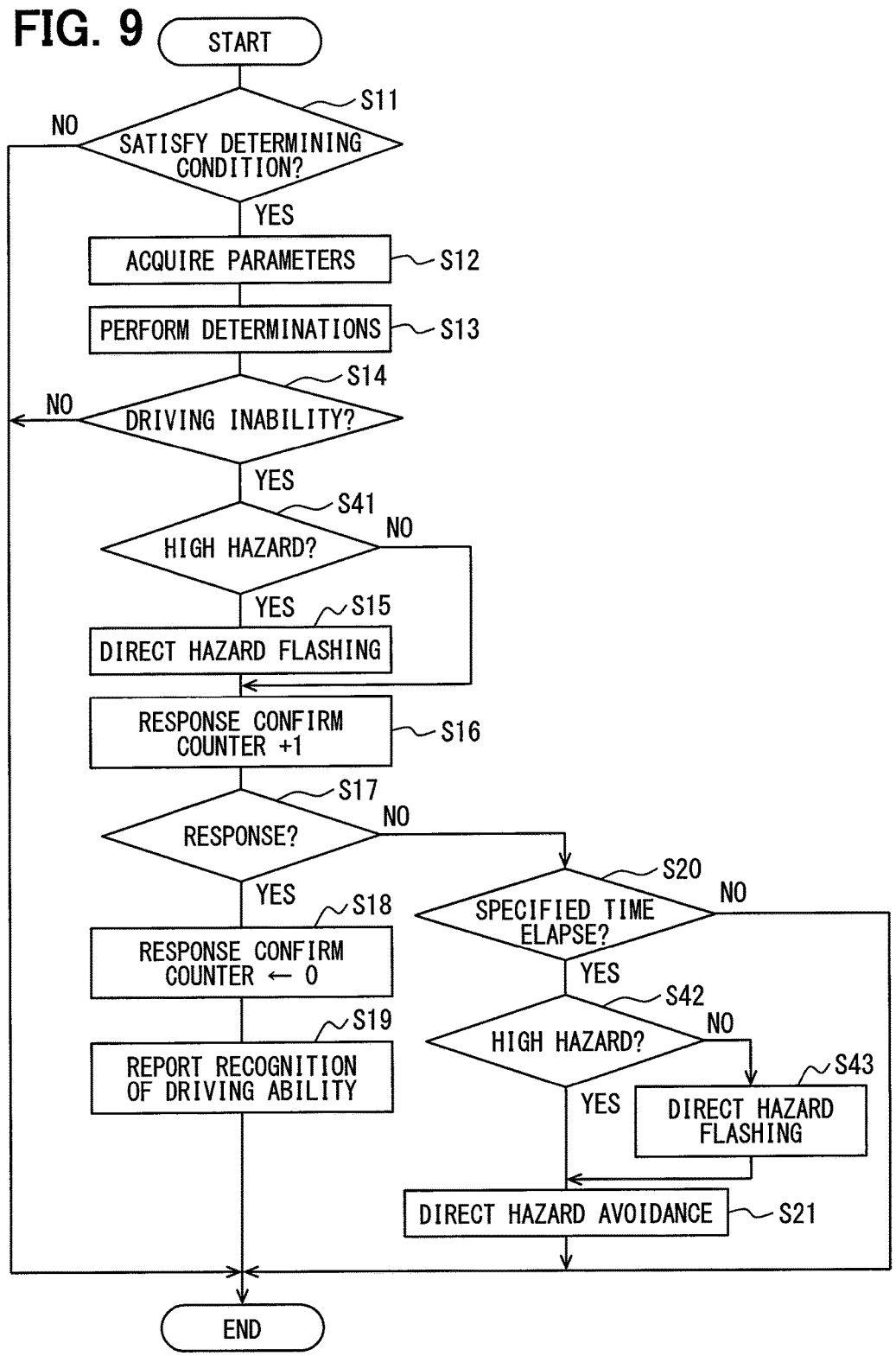

IN-VEHICLE CONTROL APPARATUS

CROSS REFERENCE TO RELATED APPLICATIONS

This application is a U.S. National Phase Application under 35 U.S.C. 371 of International Application No. PCT/JP2015/003600 filed on Jul. 16, 2015 and published in Japanese as WO 2016/027411 A1 on Feb. 25, 2016. ThisThe present application is based on and claims the benefit of priority from Japanese Patent Application No. 2014-169541 filed on Aug. 22, 2014. The entire disclosures of all of the above applications are incorporated herein by reference.

TECHNICAL FIELD

The present disclosure relates to an in-vehicle control apparatus.

BACKGROUND ART

While driving a vehicle, a sudden illness may disable a driver from recognition, decision, or manipulation needed for driving, eventually causing an accident. To solve this issue, there is proposed a technology to determine a driver anomaly such as postural imbalance. For example, a driving control apparatus described in patent literature 1 detects a pressure of driver's buttocks on a driver's seat surface, a pressure of the driver's back on a seat back, and a pressure of the driver's left foot on a floor. The driving control apparatus determines whether the driver's posture is normal, leans forward, or leans backward, based on distribution of the pressures. The driving control apparatus determines that the driver's physical condition is abnormal when the driver's posture leans forward or backward.

Herein, after detecting a driver anomaly such as postural imbalance, the system confirms to the driver whether the driver's physical condition is abnormal. The system takes measures to avoid a hazard when no response returns from the driver. Specifically, the system provides audiovisual notification in a vehicle compartment when detecting a driver anomaly. The system performs a hazard avoidance process if a specified time elapses while no response returns from the driver. For example, the hazard avoidance process flashes a hazard lamp to report a possibility of hazard occurrence to an area external to the vehicle, namely, the vicinity of a system-installed vehicle. The hazard avoidance process also forces the vehicle to decelerate, stop, or pull over to the shoulder.

PRIOR ART LITERATURES

Patent Literature

Patent Literature 1: JP 2012-254745 A

SUMMARY OF INVENTION

The above conventional technology issues an alarm outwardly from the vehicle at the time when a specified time elapses to confirm a response from the driver since the determination of an occurrence. However, the driver may become unable to drive due to a sudden illness. In such a case, measures directed to the vicinity of the vehicle may delay.

It is an object of the present disclosure to provide an in-vehicle control apparatus capable of implementing measures appropriate for safety when a driver becomes unable to drive.

According to an example of the present disclosure, an in-vehicle control apparatus is provided to perform monitoring of a state of a driver in a vehicle and controls behavior of the vehicle based on the monitoring to perform a hazard avoidance process. The in-vehicle control apparatus includes an anomaly determination section, an alarm control section, and a hazard avoidance control section. The anomaly determination section determines whether a driver is under driving inability state where the drive is unable to drive during travel of the vehicle, based on information on the monitoring of the state of the driver. The alarm control section activates an alarm annunciator to issue an alarm outwardly from the vehicle when the anomaly determination section determines that the driver is under driving inability state. After the alarm annunciator starts the alarm outwardly from the vehicle, the hazard avoidance control section fails to perform the hazard avoidance process when the alarm is stopped by a manipulation of the driver, and performs the hazard avoidance process when a specified time elapses since the starting of the alarm with the alarm being not stopped.

An existing technology determines a driver's anomaly and then confirms the anomaly to the driver. If no response returns from the driver, the existing technology issues an alarm outwardly from the vehicle and simultaneously performs the hazard avoidance process that forces the vehicle to decelerate, stop, or pull over to the shoulder. The alarm is issued outwardly from the vehicle after a lapse of time for confirmation since the determination of an anomaly occurrence. The existing technology assumes that the driver can recover from an anomaly (e.g., a drowse or a condition assumed to be relatively highly likely to return to normal) after audiovisually confirming a response from the driver. The alarm is issued outwardly from the vehicle while considering a possibility of returning to normal.

In contrast, the in-vehicle control apparatus according to the example of the present disclosure determines whether a driver is unable to drive due to a sudden illness while driving. When the driver is determined to be unable to drive, the alarm annunciator is activated to issue an alarm outwardly from the vehicle before the hazard avoidance process is performed. The hazard avoidance process is not performed when the driver's manipulation stops an alarm after the alarm annunciator starts issuing the alarm outwardly from the vehicle. The hazard avoidance process is performed after a lapse of specified time from the start of the alarm on condition that the alarm is not stopped. In such a case, it is critical to avoid occurrence of an accident resulting from the driver's inability to drive if the driver is unlikely to return to normal after the driver becomes unable to drive. The above configuration issues an alarm outwardly from the vehicle in advance. This can fast alert the vicinity of the vehicle. Thus, measures appropriate for safety can be implemented when the driver is unable to drive.

BRIEF DESCRIPTION OF DRAWINGS

The above and other objects, features and advantages of the present disclosure will become more apparent from the following detailed description made with reference to the accompanying drawings. In the drawings:

FIG. 9 is a flowchart illustrating a process to determine whether a driver is unable to drive, according to a third embodiment;

EMBODIMENTS FOR CARRYING OUT INVENTION

First Embodiment

Figure 1:
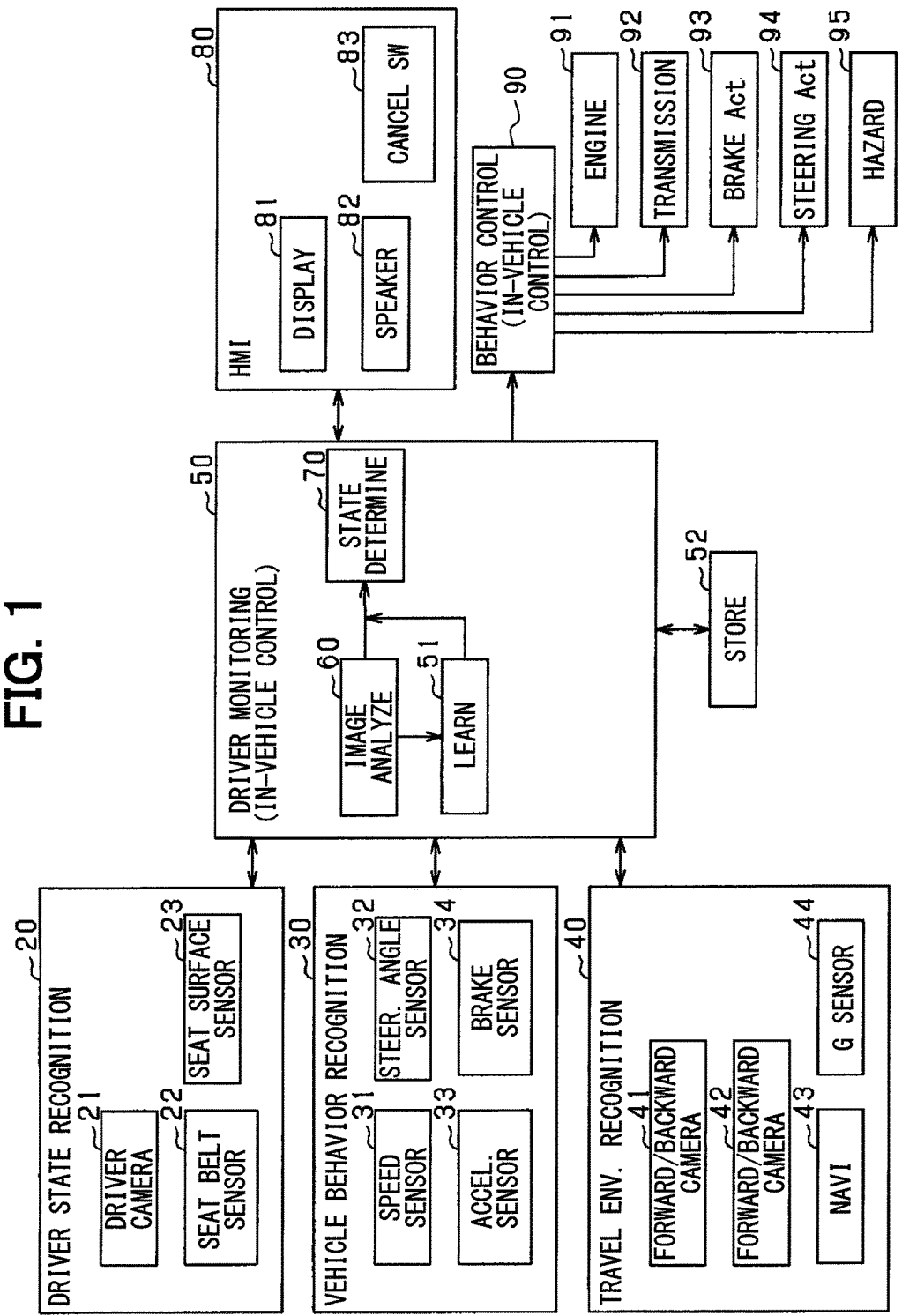
FIG. 1 is a block diagram illustrating a configuration of an in-vehicle system.
Figure 2:
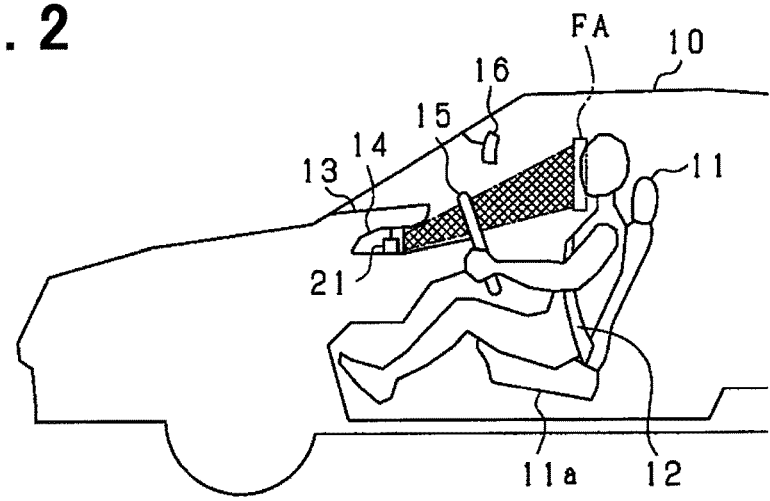
FIG. 2 is a diagram illustrating a configuration in a vehicle compartment.
Figure 3:
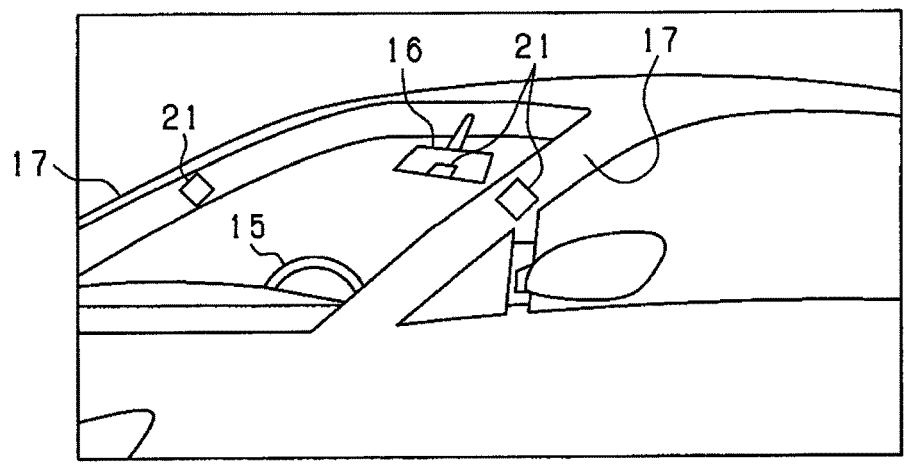
FIG. 3 is a diagram illustrating a driver's seat of a vehicle.

An embodiment of the present disclosure will be described with reference to the accompanying drawings. The description below explains a configuration of the in-vehicle system according to a first embodiment with reference to FIGS. 1 through 3. The system is mounted on a vehicle and includes an in-vehicle control apparatus, a driver state recognition apparatus 20, a vehicle behavior recognition apparatus 30, a travel environment recognition apparatus 40, and an HMI (Human Machine Interface) 80. The in-vehicle control apparatus includes a driver monitoring apparatus 50 and a behavior control apparatus 90. A vehicle mounted with the system is also referred to as a host vehicle or as a subject vehicle. The driver monitoring apparatus 50 determines whether the driver is under driving inability state where the driver is unable to drive, based on information from the recognition apparatuses, and notifies the HMI 80 and the behavior control apparatus 90 of a possible result of the determination that the driver is unable to drive. When the driver is unable to drive, the behavior control apparatus 90 issues an alarm inward and outward of the host vehicle and performs a hazard avoidance process to safely stop the vehicle. The present application uses "information" as a countable noun as well as an uncountable noun.

The driver state recognition apparatus 20 includes several driver cameras 21, a seat belt sensor 22, and a seat surface sensor 23. The driver camera 21 is available as a CCD camera, for example, and captures the driver's seat illuminated by a lighting apparatus such as a near-infrared LED. As in FIGS. 2 and 3, the driver cameras 21 are installed toward a driver at an instrument panel 14, the bottom center of a rearview mirror 16, and right and left A pillars 17. The driver camera 21 may be installed on a dashboard 13 or a steering column instead of the instrument panel 14. The driver camera 21 may be installed at the right or left end of the rearview mirror 16 instead of the bottom end thereof. The four driver cameras 21 configure a driver status monitor and capture an upper half of the driver's body from the front while the driver sits on a seat 11 of the driver's seat. Several tens of images are captured per second.

The seat belt sensor 22 detects the amount of pulling out a seat belt 12. Specifically, the seat belt sensor 22 is provided as an encoder to detect a rotation angle of a motor that feeds and winds the seat belt 12. The seat surface sensor 23 detects the pressure distribution on a seat surface 11a of the seat 11 of the driver's seat.

The vehicle behavior recognition apparatus 30 (also referred to as a vehicle travel recognition apparatus or a vehicle information recognition apparatus) includes a vehicle speed sensor 31, a steering angle sensor 32, an accelerator sensor 33, and a brake sensor 34. The vehicle speed sensor 31 detects a speed of a vehicle 10. The steering angle sensor 32 detects a steering angle of a steering wheel 15. The accelerator sensor 33 detects an accelerator position, namely, the amount of manipulating an accelerator pedal. The brake sensor 34 detects the amount of manipulating a brake pedal.

The travel environment recognition apparatus 40 includes a forward/backward camera 41, a forward/backward sensor 42, a car navigation apparatus 43, and a G sensor 44. The forward/backward camera 41 captures the front of the vehicle 10 including a white line on the road and captures the rear and the rear side of the vehicle 10. The forward/backward sensor 42 is available as an ultrasonic sensor, a laser radar, or a millimeter-wave radar. The forward/backward sensor 42 detects an object ahead of or behind the vehicle 10 and acquires the distance to an object ahead of or behind the vehicle 10. A relative speed with reference to a forward vehicle or a backward vehicle can be calculated based on the distance calculated by the forward/backward sensor 42 between the vehicle 10 and the forward vehicle or the backward vehicle.

The car navigation apparatus 43 calculates a current position of the vehicle and a guidance route from the current position to a destination using a GPS signal received by a GPS receiver and information acquired by various sensors including the G sensor. The G sensor 44 is provided for the seat 11, for example, and detects a three-dimensional acceleration in front-back, horizontal, and vertical directions of the vehicle 10.

The driver monitoring apparatus 50 is configured as a microcomputer including a CPU, ROM, RAM, and I/O units. The driver monitoring apparatus 50 acquires various information from the driver state recognition apparatus 20, the vehicle behavior recognition apparatus 30, the travel environment recognition apparatus 40, the HMI 80, and a storage apparatus 52. The driver monitoring apparatus 50 is connected to the various apparatuses via wired communication such as CAN or wireless communication such as LAN or Bluetooth®. The driver monitoring apparatus 50 allows the CPU to perform various programs stored in the ROM, thereby implements functions of an image analysis section 60, a learning section 51, and a state determination section 70, and determines whether the driver is unable to drive. The functions of the image analysis section 60, the learning section 51, and the state determination section 70 may be configured as hardware such as one or more IC chips. According to the embodiment, the driver's inability to drive includes two cases. In one case, the driver cannot drive because the driver loses consciousness due to a sudden illness. In the other case, the driver cannot drive because the driver, though being conscious, cannot move his or her body due to a sudden illness such as a heart attack.

The HMI 80 includes a display 81, a speaker 82, and a cancellation switch 83. The display 81 is provided for the car navigation apparatus 43 or is provided as an in-vehicle display installed in the instrument panel 14. The display 81 may be available as a touch display using a liquid crystal panel or an organic EL panel. The display 81 notifies a degree of unbalanced driver's posture based on the driver's posture detected from an image. Specifically, the display 81 displays the status of the driver's posture in five levels. Postural imbalance level 5 is the highest and signifies the most unbalanced status. At this level, the driver cannot keep his or her driving posture due to a sudden illness and is determined to be unable to drive. The driver can confirm his or her driving posture by viewing the posture status displayed on the display 81. When the postural imbalance level approaches level 5, the driver can correct his or her driving posture before being determined to be unable to drive.

The speaker 82 is provided as an in-vehicle speaker shared by the car navigation apparatus 43 or an audio apparatus. The speaker 82 audibly confirms to the driver whether the driver is unable to drive when the driver is determined to be unable to drive. The display 81 may display a screen-view to confirm a driving inability. The speaker 82 may audibly notify the driver's postural imbalance level.

The cancellation switch 83 cancels the determination on the driving inability. A single manipulation of the cancellation switch 83 may cancel the determination on the driving inability during one trip. Further, regardless of whatever results from the determination on the driving inability, the cancellation switch 83 may be manipulated during the trip. In this case, the determination on the driving inability is stopped during manipulation of the cancellation switch 83 or during a specified time interval (several seconds) after the cancellation switch 83 is manipulated. This can avoid incorrect determination on the driving inability even if the cancellation switch 83 is manipulated beforehand due to the driver going to pick up something to unbalance the driver's posture.

The behavior control apparatus 90 is also referred to as a vehicle control apparatus or a vehicle travel control apparatus. The behavior control apparatus 90 controls a travel or a behavior of the vehicle 10 and performs the hazard avoidance process when the driver monitoring apparatus 50 determines that the driver is unable to drive. For example, the behavior control apparatus 90 controls an engine 91, a transmission 92, or a brake actuator 93 of the vehicle 10 to decelerate or stop the vehicle 10. In addition, the steering actuator 94 controls a steering angle of the steering wheel 15 and thereby allows the vehicle 10 to pull over to the shoulder.

The behavior control apparatus 90 includes a function to control flashing of a hazard lamp 95 (hazard warning flashing lamp) as an alarm annunciator. The behavior control apparatus 90 flashes the hazard lamp 95 and thereby issues an alarm outwardly from the vehicle when the driver is determined to be unable to drive.

Figure 4:
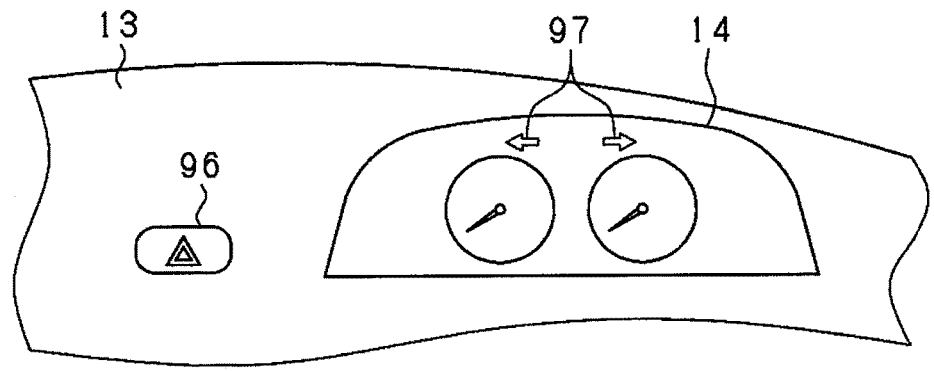
FIG. 4 is a diagram illustrating a configuration adjacent to a dashboard of the vehicle.

As publicly known, the hazard lamp 95 is provided as an indicator that is also used as a turn signal (turn signal lamp) provided at the front and the rear of the vehicle. As in FIG. 4, a hazard switch 96 is provided for the dashboard 13 in the vehicle compartment. Each press of the hazard switch 96 allows the hazard lamp 95 to switch between a flashing state and a turn-off state. The instrument panel 14 is provided with a hazard display mark 97 to indicate that the hazard lamp 95 flashes.

Figure 5:
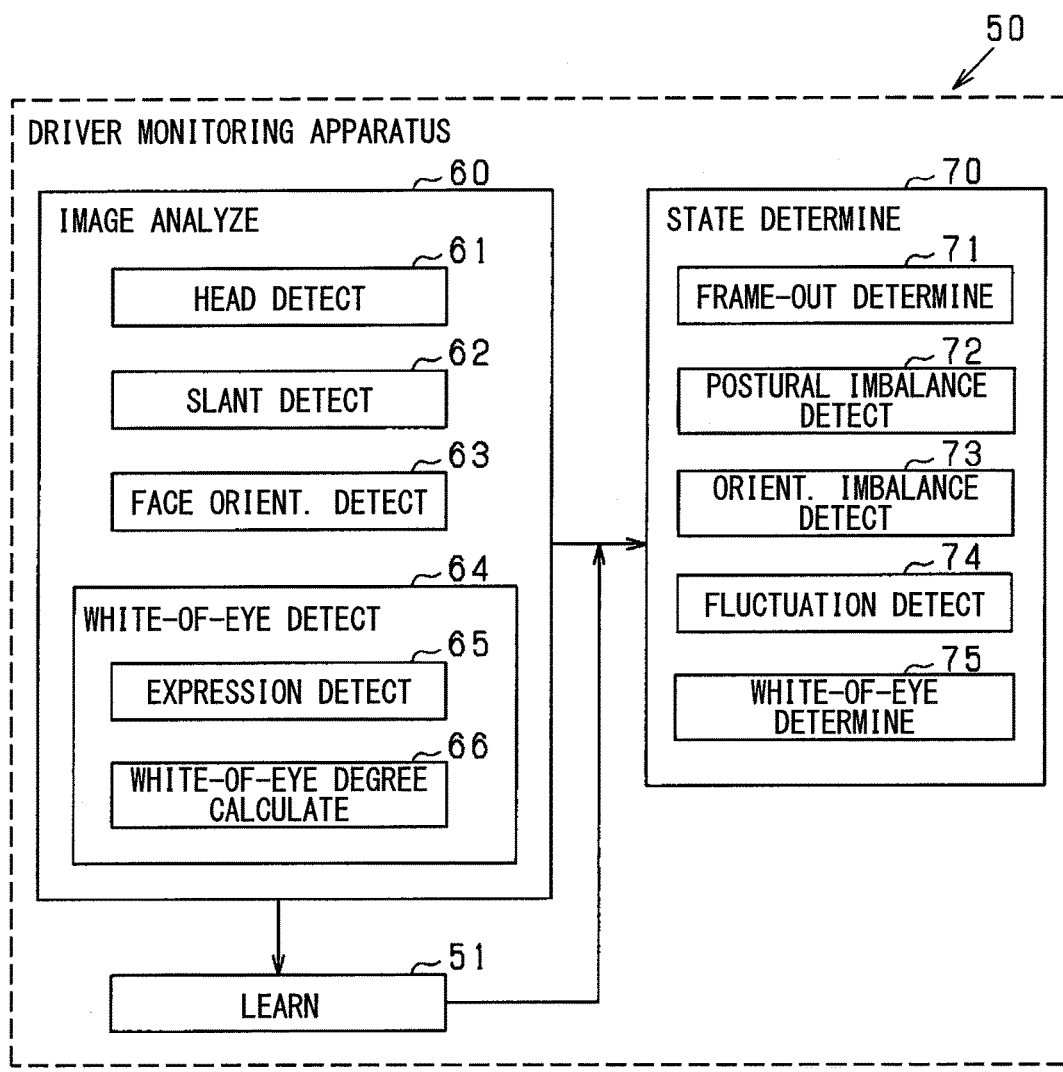
FIG. 5 is a block diagram illustrating functions of a driver monitoring apparatus.

The description below explains various functions implemented by the driver monitoring apparatus 50 with reference to FIG. 5. The image analysis section 60 includes a head detection section 61, a slant detection section 62, a face orientation detection section 63, and a white-of-the-eye detection section 64.

The head detection section 61 successively detects the driver's head higher than the driver's neck based on a driver's seat image captured by the driver camera 21. Specifically, the head detection section 61 extracts edges representing an outline of the driver's head from the driver's seat image each time the driver camera 21 captures the driver's seat image. The head detection section 61 detects an area surrounded by the extracted edges as a head.

The slant detection section 62 detects slant θ of the head with reference to the driver's body based on the driver's seat image. Specifically, the slant detection section 62 detects an area surrounded by edges representing the head as the head. The slant detection section 62 detects an area surrounded by edges representing the body as the body. The slant detection section 62 also detects center axes of the head and the body. The slant detection section 62 assumes that the center axis of the head forms head slant θ with reference to the center axis of the body. To detect the center axis of the body, the slant detection section 62 determines the orientation of the body by performing matching between a predetermined pattern of orientations of the body and the orientation of the detected body. The slant detection section 62 detects the center axis from the body whose orientation is determined. To detect the center axis of the head, the slant detection section 62 extracts feature points of eyes, a nose, and a mouth on the face included in the head. The slant detection section 62 detects the center axis from a three-dimensional configuration of the face feature points. Forward leaning the head decreases the distance between the feature point of the face and the front of the vehicle. Backward leaning the head increases the distance between the feature point of the face and the front of the vehicle. The slant detection section 62 may use a distance from the feature point of the face in the front-back direction to detect the center axis of the head.

Alternatively, the slant detection section 62 detects the seat belt 12 of the driver's seat from the driver's seat image. The slant detection section 62 detects the head slant θ against the body based on the positional relation between the seat belt 12 and the head. The position of the body can be estimated from the position of the seat belt 12 because the seat belt 12 restrains the driver's body.

The face orientation detection section 63 detects the orientation of the driver's face with reference to the front of the vehicle 10 based on the driver's seat image. The face orientation detection section 63 detects a face orientation, namely, a slant of the face with reference to a vertical plane opposite the front of the vehicle 10.

The white-of-the-eye detection section 64 includes an expression detection section 65 and a white-of-the-eye degree calculation section 66 and detects a state in which the driver's eyes roll to the back of his or her head. The state in which the driver's eyes roll to the back of his or her head is not limited to a state in which the driver's eyes completely roll to the back of his or her head, but also includes a state in which a colored part of the eye is smaller than a specified amount. Namely, the state in which the driver's eyes roll to the back of his or her head signifies a state in which the pupil moves to cause a visual field to be narrower than a specified range.

The expression detection section 65 detects an outline of the driver's eye and the colored part of the eye based on the driver's seat image. The outline of the driver's eye signifies a boundary between the eyelid and the eye. The colored part of the eye belongs to an area inside the outline of the eye and indicates a lower intensity than the white of the eye. The colored part of the eye is not limited to black, but also signifies blue, brown, or gray. The expression detection section 65 detects an opening of the driver's mouth from edges representing an outline of the extracted mouth.

The white-of-the-eye degree calculation section 66 calculates a white-of-the-eye degree of the driver's eye based on the outline of the eye and the colored part of the eye detected by the expression detection section 65. Specifically, the white-of-the-eye degree calculation section 66 calculates the white-of-the-eye degree based on any of the following.

A vertical length of the colored part of the eye

An area of the colored part of the eye

A ratio between a vertical length of an area surrounded by the outline of the eye and the vertical length of the colored part of the eye Oblateness of the colored part of the eye The learning section 51 learns head slant θ detected by the slant detection section 62 unless the driver is unable to drive. The learning section 51 learns the face orientation detected by the face orientation detection section 63 unless the driver is unable to drive. The learning section 51 learns an amplitude of head fluctuation detected by the head detection section 61 unless the driver is unable to drive. Namely, the learning section 51 learns a tendency of the driver's driving posture. The learning section 51 learns a tendency of driving posture for each of drivers, if any, who drive the vehicle 10.

The state determination section 70 performs:
(1) Frame-out determination,
(2) Postural imbalance determination,
(3) Orientation imbalance determination,
(4) Fluctuation determination, and
(5) White-of-the-eye determination based on various types of driver monitoring information acquired by the image analysis section 60. The state determination section 70 performs the determinations to determine whether the driver is unable to drive. The state determination section 70 includes a frame-out determination 71, a postural imbalance determination 72, an orientational imbalance determination 73, a fluctuation determination 74, and a white-of-the-eye determination 75. These are described below in order.

(1) Frame-Out Determination

The frame-out determination 71 determines a frame-out state of the driver's head while the vehicle 10 travels. The driver is determined to be unable to drive if a frame-out state is found. Specifically, the frame-out determination 71 determines that the driver is unable to drive when the driver's head detected by the head detection section 61 is positioned outside range FA (see FIG. 2) of the image and this state continues for specified time T1 or longer. Range FA is predetermined for an image captured by the driver camera 21. During normal driving, the driver's head stays within range FA. Range FA may correspond to the whole of a captured image. When viewed from the front, range FA is favorably recognized through a windshield.

The driver's head usually stays within range FA while the driver normally drives the vehicle 10 even if the driver moves to pick up something. However, the driver's head may be positioned outside range FA when the driver loses consciousness due to a sudden illness. The frame-out determination 71 determines that the driver is unable to drive when the driver's head is positioned outside range FA of the image. The determination whether the driver is unable to drive can use head position information in the past in consideration of a locus formed until the driver's head is positioned outside range FA.

The frame-out determination can be performed using information from the seat belt sensor 22 and the seat surface sensor 23. Specifically, the frame-out determination determines that the driver is unable to drive when the driver's head is placed in a frame-out state, the extended seat belt 12 is longer than a first extended length detected when the extended seat belt 12 was worn, and distribution of pressures on the seat surface 11a indicates a high-pressure region concentrating on the end of the seat surface 11a.

(2) Postural Imbalance Determination

The postural imbalance determination 72 determines the driver's postural imbalance while the vehicle 10 travels. The postural imbalance determination 72 determines that the driver is unable to drive when a postural imbalance is found. Specifically, the postural imbalance determination 72 determines that the driver is unable to drive when head slant θ detected by the slant detection section 62 is larger than threshold value Th1 (relative slant threshold value) and this state continues for specified time T2 or longer.

Normally, the seat 11 of the driver's seat or the seat belt 12 restrains the driver's body. The body is relatively unmovable if the driver loses consciousness. However, the driver's head is usually not restrained. The driver needs to consciously maintain the position of his or her own head. The driver cannot maintain the position of his or her own head if the driver loses consciousness due to a sudden illness. In many cases, the head largely slants in any direction with reference to the body.

The driver typically turns his or her head to look around when the driver drives inattentively. This often decreases the head slant with reference to the body. The driver consciously leans his or her body to pick up something distant from the driver's seat. This often decreases head slant θ with reference to the body. Therefore, the postural imbalance determination 72 determines that the driver is unable to drive when head slant θ is larger than threshold value Th1. Further, the postural imbalance determination 72 may determine that the driver is unable to drive on condition that the driver's face is not directed ahead of the vehicle 10. This can avoid incorrect determination on inability to drive.

(3) Orientation Imbalance Determination

The orientational imbalance determination 73 determines imbalance of the driver's face orientation while the vehicle 10 travels. The orientational imbalance determination 73 determines that the driver is unable to drive if the face orientation is unbalanced. Specifically, the orientational imbalance determination 73 determines that the driver is unable to drive when the face orientation with reference to the front of the vehicle 10 is larger than threshold value Th2 (face orientation threshold value) and this state continues for specified time T3 or longer. The face orientation is detected by the face orientation detection section 63.

Mostly, the driver cannot maintain the orientation of his or her face due to a sudden illness. The face orientation remains unbalanced with reference to the front of the vehicle. Suppose the driver drives inattentively during traveling. The driver quickly returns the face orientation, if changed, to the original orientation. Therefore, the orientational imbalance determination 73 determines that the driver is unable to drive when the face orientation with reference to the front of the vehicle is larger than threshold value Th2.

The orientational imbalance determination 73 may determine that the driver is unable to drive when:

The face orientation detected by the face orientation detection section 63 with reference to the front of the vehicle 10 is larger than threshold value Th2 and the driver releases his or her hand from the steering wheel 15;

The face orientation detected by the face orientation detection section 63 is larger than threshold value Th2 and an accelerator position is larger than a predetermined value; or The face orientation detected by the face orientation detection section 63 is larger than threshold value Th2 and the accelerator and the brake are not manipulated for a time interval longer than a predetermined time interval.

(4) Fluctuation Determination

The fluctuation determination 74 determines a fluctuation of the driver's head due to an external force while the vehicle 10 travels. The fluctuation determination 74 determines that the driver is unable to drive if the head fluctuates abnormally. Specifically, the head detection section 61 detects an amplitude of the head fluctuation when an external force is applied to the vehicle 10. The fluctuation determination 74 determines that the driver is unable to drive when the detected amplitude is smaller than amplitude Am1 (first amplitude) or is larger than amplitude Am2 (second amplitude) and this state continues for specified time T4 or longer. Amplitude Am2 is larger than amplitude Am1.

When an external force is applied to the vehicle 10, a vibration is transmitted to the driver after a specified time lag. If the driver retains his or her consciousness, the driver's head normally fluctuates with an amplitude ranging from amplitude Am1 to amplitude Am2 when an external force or, more specifically, an external force in the vertical direction is applied to the vehicle 10. However, the driver's head fluctuates with an amplitude smaller than normal when the driver's body rigidifies due to a sudden illness. The driver's head fluctuates with an amplitude larger than normal when the driver's body relaxes due to a sudden illness. In these cases, the fluctuation determination 74 determines that the driver is unable to drive.

(5) White-of-the-Eye Determination

The white-of-the-eye determination 75 determines a white-of-the-eye condition while the vehicle 10 travels. The white-of-the-eye determination 75 determines that the driver is unable to drive when the white-of-the-eye detection section 64 detects a condition in which the driver rolls his or her eyes up into his or her head. Specifically, the white-of-the-eye determination 75 determines that the driver is unable to drive when a white-of-the-eye degree calculated by the white-of-the-eye degree calculation section 66 is larger than threshold value Th3 (white-of-the-eye threshold value) and this state continues for specified time T5 or longer.

Normally, the driver does not roll his or her eyes up into his or her head when the driver is able to drive. However, the driver may roll his or her eyes up into his or her head due to a sudden illness. The white-of-the-eye determination 75 determines that the driver is unable to drive when detecting a condition in which the driver rolls his or her eyes up into his or her head.

The storage apparatus 52 stores threshold values and determination values used for the determinations. The storage apparatus 52 stores head slant θ, the face orientation, and the amplitude of head fluctuation learned by the learning section 51. The storage apparatus 52 registers personal information including the driver's medical history and age. The storage apparatus 52 registers the personal information about each of drivers if any. The storage apparatus 52 registers a driver's posture not determined to be incapable of driving and a driver's posture determined to be incapable of driving. The driver's posture not determined to be incapable of driving signifies a normal driving posture or a usual posture maintained during driving. The driver's posture determined to be incapable of driving signifies a posture maintained by a driver having a chronic disease at the onset of an attack. To register the posture, the driver captures his or her posture on the driver's seat in advance using the driver camera 21 and registers the posture to the storage apparatus 52.

Time intervals T1 through T5 in the determinations signify several seconds (e.g., one to five seconds) and may be defined as different lengths or as the same length for each of the determinations. Time intervals T1 through T5 may be configured to be variable depending on various conditions. Specifically, time intervals T1 through T5 can be configured based on the personal information registered to the storage apparatus 52. For example, time intervals T1 through T5 for an aged person are lower than a younger person. Time intervals T1 through T5 for a person having a specific medical history are shorter than a person having no specific medical history. Further, time intervals T1 through T5 can be changed depending on driver conditions or travel environments. Time intervals T1 through T5 are shortened to easily determine the driver's inability to drive when: the driver indicates a symptom of being unable to drive; the driver is highly likely to be unable to drive; or the travel environment has a high risk of collision if the driver gets to be unable to drive.

To avoid a collision, there is an increasing need to start appropriate vehicle control as the vehicle speed increases. Time intervals T1 through T5 are shortened as a vehicle speed of the host vehicle increases. To avoid a collision, time intervals T1 through T5 are shortened as TTC (time-to-collision) shortens. The time-to-collision is found by dividing an inter-vehicular distance to a preceding vehicle by a relative speed with reference to the preceding vehicle. Time intervals T1 through T5 are extended when the host vehicle performs driving support control such as ACC (Adaptive Cruise Control) or LKA (Lane Keep Assist). This is because the driver may unbalance the posture for a long time in this case.

The in-vehicle system flashes the hazard lamp 95 to issue an alarm outwardly from the vehicle immediately after the driver is determined to be unable to drive while the vehicle travels. After the hazard lamp 95 starts issuing an alarm outwardly from the vehicle, the in-vehicle system does not perform the hazard avoidance process such as forcing the host vehicle to decelerate, stop, or pull over to the shoulder if the driver's manipulation stops the alarm. The in-vehicle system performs the hazard avoidance process after a lapse of a specified time from the time to start hazard flashing if the driver's manipulation does not stop the alarm.

Figure 6:
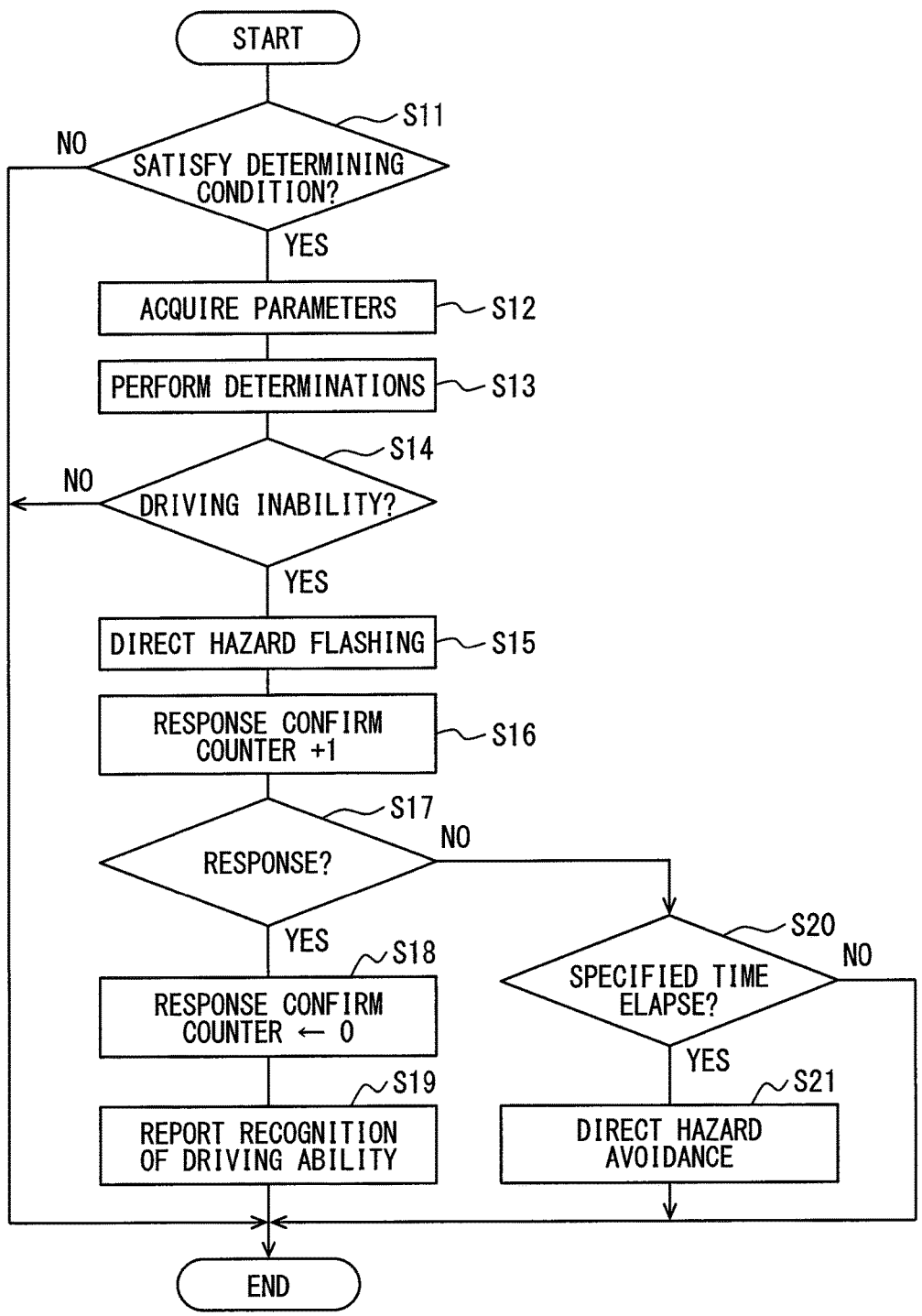
FIG. 6 is a flowchart illustrating a process to determine whether a driver is unable to drive.

With reference to a flowchart in FIG. 6, the description below explains a process to determine whether the driver is unable to drive. The driver monitoring apparatus 50 repeatedly performs the process at a specified cycle.

It is noted that a flowchart or the processing of the flowchart in the present application includes sections (also referred to as steps), each of which is represented, for instance, as S11. Further, each section can be divided into several sub-sections while several sections can be combined into a single section. Furthermore, each of thus configured sections can be also referred to as a device or a module. Further, for instance, a control section may be referred to as not only a control device or a control module, but also as a controller; a determination section may be referred to as not only a determination device or a determination module, but also as a determiner; a selection section may be referred to as not only a selection device or a selection module, but also as a selector.

At S11, it is determined whether a condition to determine driving inability is satisfied. In this case, the driver monitoring apparatus 50 determines that the condition is satisfied when the host vehicle's speed is larger than a specified value (e.g., 0 km/h) and the host vehicle is traveling. The processing proceeds to S12 if the condition is satisfied. The driver monitoring apparatus 50 terminates the process if the condition is not satisfied.

At S12, various parameters are acquired which are used to determine driving inability. Specifically, the followings are acquired:

Information about the driver's head and body detected from a driver's seat image;

Information about head slant θ with reference to the driver's body;

Information about the driver's face orientation with reference to the vehicle front; and Information about detection of the white of the driver's eye.

At S13, various determination processes are performed using the parameters acquired at S12 to determine whether the driver is unable to drive. According to the embodiment, the above determination processes (1) through (5) are performed to determine whether the driver is unable to drive.

Specifically, the frame-out determination process is performed to determine whether the driver's head continues to be positioned outside range FA of the image and this state continues for time T1 or longer. The postural imbalance determination process is performed to determine whether head slant θ with reference to the driver's body continues to be larger than threshold value Th1 for time T2 or longer. The orientational imbalance determination process is performed to determine whether the driver's face orientation with reference to the front of the vehicle continues to be larger than threshold value Th2 for time T3 or longer. The fluctuation determination process is performed to determine whether the driver's head continues to fluctuate abnormally due to an external force for time T4 or longer. The white-of-the-eye determination process is performed to determine whether the driver's white-of-the-eye degree continues to be larger than threshold value Th3 for time T5 or longer.

Priorities may be predetermined to perform the determination processes (1) through (5). There may be a case where one of the determination processes indicates an anomaly. In this case, the other determination processes may not be performed.

At S14, it is determined whether the driver is unable to drive, based on a result from each determination process at S13. Here, S14 is affirmed if at least one of the determination processes at S13 indicates an anomaly occurrence. The processing proceeds to S15. S14 may be also referred to as an anomaly determination section that determines whether the driver is unable to drive, based on the driver monitoring information.

At S15, a directive on hazard flashing is issued. The driver monitoring apparatus 50 outputs a directive signal for hazard flashing to the behavior control apparatus 90. The behavior control apparatus 90 flashes the hazard lamp 95 based on the directive signal. This flashes the hazard lamp 95 at the front and the rear of the vehicle 10 and flashes the hazard display mark 97 on the instrument panel 14. In terms of an exterior alarm around the host vehicle, a preceding vehicle traveling ahead of the host vehicle may hardly notice the hazard lamp 95 if flashed. An exterior alarm may be issued by operating a horn in addition to flashing of the hazard lamp 95. S15 may be also referred to as an alarm control section that issues an alarm outwardly from the vehicle by activating the hazard lamp 95 (functioning as an alarm annunciator).

At S16, a response confirmation counter is incremented by one. The response confirmation counter is a timekeeping section that measures an elapsed time from the determination that the driver is unable to drive (S14: YES).

At S17, a possible response from the driver is determined after the determination that the driver is unable to drive. Specifically, it is determined whether the driver presses the hazard switch 96 after noticing that the hazard lamp 95 (hazard display mark 97) flashes. If a response returns from the driver, the processing proceeds to S18 assuming that the driver is able to drive or the driver's inability to drive is solved. If no response returns from the driver, the processing proceeds to S20 assuming that the driver's inability to drive continues.

At S18, the response confirmation counter is reset to 0. At S19, recognition of the driver's ability to drive is reported using a sound from the speaker 82 or an indication on the display 81. At this time, the driver monitoring apparatus 50 outputs a directive signal to the behavior control apparatus 90 in order to stop the hazard flashing or the horn operation.

At S20, it is determined whether a specified time elapses after the determination that the driver is unable to drive. Specifically, it is determined whether the response confirmation counter reaches a specified value. The specified value is set to several seconds (e.g., three to five seconds).

The processing proceeds to S21 if no response returns from the driver after a lapse of the specified time (S20: YES). At S21, a directive is issued to perform the hazard avoidance process such as forcing the vehicle 10 to decelerate, stop, or pull over to the shoulder. In this case, the driver monitoring apparatus 50 outputs a directive signal to start the hazard avoidance process to the behavior control apparatus 90. Based on the directive signal, the behavior control apparatus 90 appropriately controls the engine 91, the transmission 92, the brake actuator 93, and the steering actuator 94 to safely stop the vehicle 10. It is favorable to give an audible alarm using a speaker also to the other passengers of the vehicle 10. As above, S17 through S21 are also referred to as a hazard avoidance control section. After the alarm annunciator starts generating an alarm outwardly from the vehicle, the hazard avoidance control section does not perform the hazard avoidance process if the driver's manipulation stops the alarm. The hazard avoidance control section performs the hazard avoidance process if the driver's manipulation does not stop the alarm.

Note that an interior alarm (to the driver) such as a sound from the speaker 82 or an indication on the display 81 may be issued under condition of the determination that the driver is unable to drive (S14: YES). It may be determined whether there is a response to the interior alarm. In this case, a response from the driver is determined (S17: YES) if detecting the driver's touch on a touch display, the driver's voice, manipulation on the host vehicle using the steering wheel 15 or the brake, or manipulation of the cancellation switch 83 within a specified time.

Figure 7:
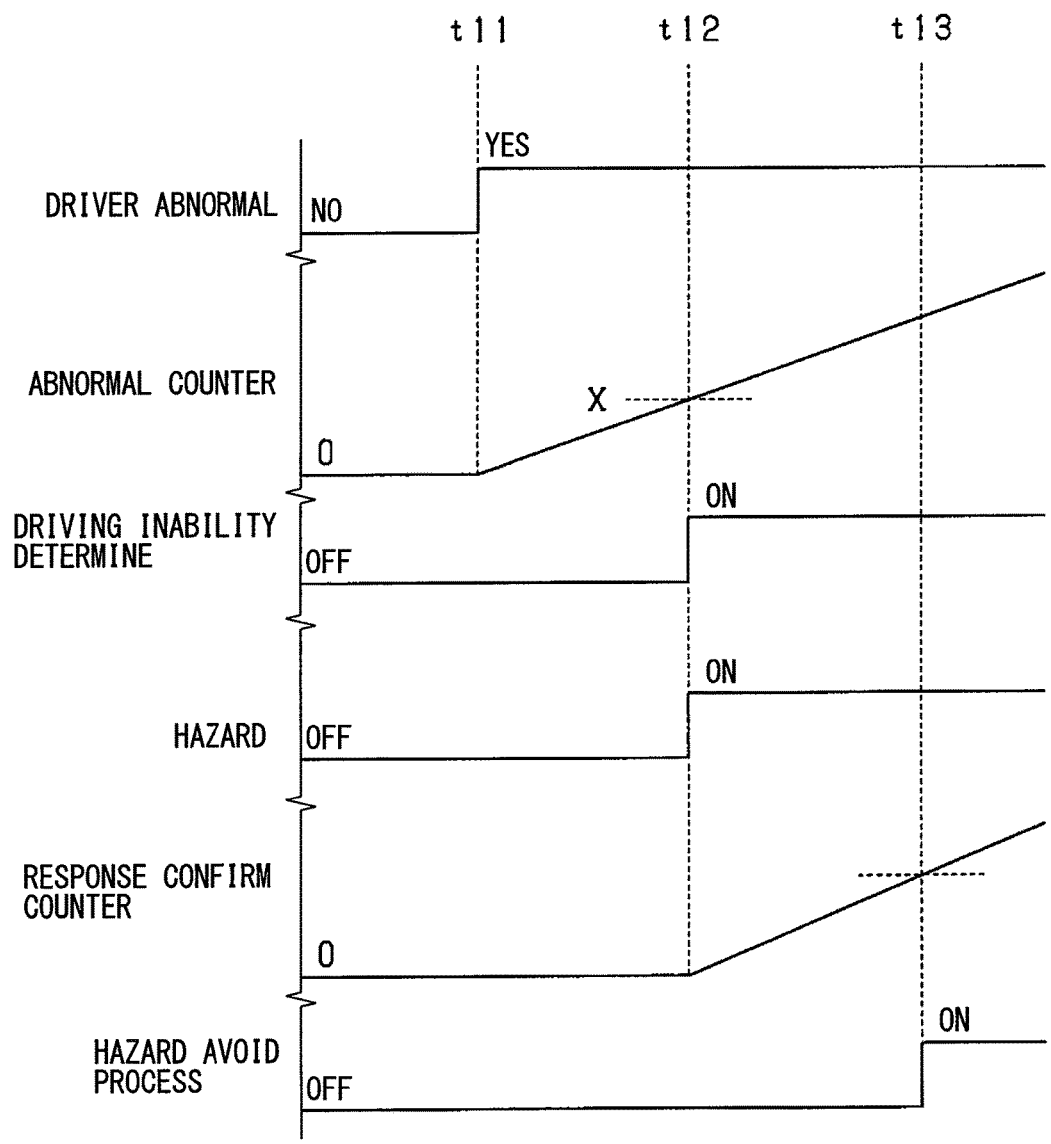
FIG. 7 is a time chart illustrating measures taken when a driver is unable to drive.

FIG. 7 is a time chart illustrating measures taken when a driver is unable to drive.

At timing t11, the driver monitoring apparatus 50 starts incrementing an anomaly counter, determining that the driver exhibits a symptom of some abnormal state (frame-out anomaly, postural imbalance anomaly, orientation imbalance anomaly, fluctuation anomaly, or white-of-the-eye anomaly) due to a sudden illness. At timing t12, the counter value reaches specified threshold value X (corresponding to one of times T1 through T5). It is determined that the driver is unable to drive. At this time, the hazard lamp 95 starts flashing to issue an exterior alarm. Further, the response confirmation counter starts incrementing.

A specified time may elapse to reach timing t13 with no response from the driver. In this case, the hazard avoidance process is performed which forces the vehicle 10 to decelerate, stop, or pull over to the shoulder. Though not illustrated, the hazard avoidance process is not performed if the driver's manipulation stops the hazard flashing (a response from the driver) before timing t13.

The above embodiment provides the following advantageous effects.

The embodiment determines whether the driver in charge of driving is unable to drive due to a sudden illness while the vehicle 10 travels. When the driver is determined to be unable to drive, the embodiment immediately activates the hazard lamp 95 (alarm annunciator) to issue an alarm outwardly from the vehicle before performing the hazard avoidance process. After the hazard lamp 95 starts issuing an alarm outwardly from the vehicle, the hazard avoidance process is not performed if the driver's manipulation stops the hazard flashing. The hazard avoidance process is performed after a lapse of specified time from the time to flash the hazard lamp if the driver's manipulation does not stop the hazard flashing. In this case, the driver's inability to drive is unlikely to return to the normal state. It is important to prevent the occurrence of an accident due to the driver's inability to drive. The embodiment issues an alarm outwardly from the vehicle in advance and therefore can fast give an alarm around the vehicle. Thus, the embodiment can implement measures appropriate for safety when the driver is unable to drive.

The hazard avoidance process can transfer the control to manipulate the vehicle 10 from the driver to the vehicle and forcibly operate traveling states of the vehicle 10. The hazard avoidance process transfers the control after confirming a response from the driver, not after flashing of the hazard lamp 95, and therefore can prevent the vehicle from being operated despite the driver's intentions.

According to a regulation, the use of the hazard lamp 95 to issue an alarm outwardly from the vehicle is limited to making a signal for turning right, left, or around, reducing the speed, stopping, going in reverse, and changing the route. The embodiment can flash the hazard lamp 95 on the premise of performing the hazard avoidance process to decelerate, stop, or pull over to the shoulder under assumption that the driver is unable to drive when the driver loses consciousness due to a sudden illness.

When the hazard lamp 95 is used as an alarm annunciator, the embodiment can flash the hazard display mark 97 on the instrument panel 14 as an alarm for the driver in the vehicle compartment. Further, the hazard switch 96 can be used as a reset button to confirm a response. In this case, the HMI function can be replaced by the hazard lamp 95 and the accompanying configuration. The configuration can be simplified because the HMI 80 need not be changed.

The description below explains other embodiments resulting from partially modifying the first embodiment mainly in terms of differences from the first embodiment.

Second Embodiment

A second embodiment issues both a first alarm and a second alarm, which are issued outwardly from the vehicle. The first alarm is issued by using the hazard lamp 95 immediately after the driver is determined to be unable to drive. The second alarm is issued by the hazard lamp 95 following confirming no response from the driver after a lapse of specified time from a point to start the first alarm; the second alarm is issued in a mode more easily recognized around the host vehicle than the first alarm.

Figure 8:
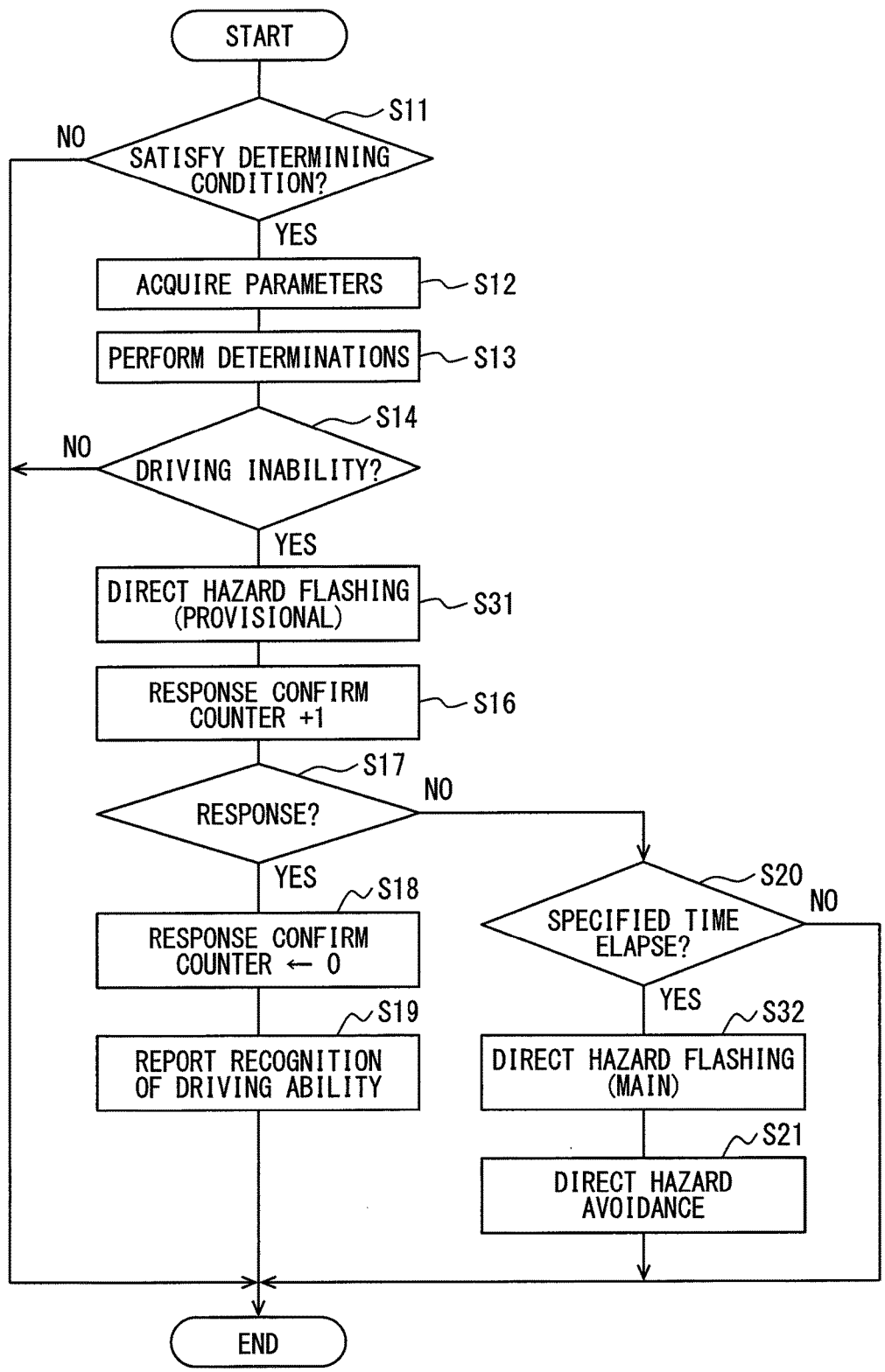
FIG. 8 is a flowchart illustrating a process to determine whether a driver is unable to drive, according to a second embodiment.

FIG. 8 is a flowchart illustrating a process according to the present embodiment. The driver monitoring apparatus 50 performs this process that replaces the process in FIG. 6. The mutually corresponding parts in FIGS. 8 and 6 are designated by the same reference symbols and a description is omitted for the purpose of illustration. In FIGS. 8, S31 and S32 are newly added.

At S11 through S14 in FIG. 8, it is determined whether the driver is unable to drive. The processing proceeds to S31 if the driver is determined to be unable to drive. At S31, a directive on flashing the hazard lamp 95 is issued in a first mode. The processing proceeds to S32 if a specified time elapses without any response from the driver since the driver is determined to be unable to drive. At S32, a directive on flashing the hazard lamp 95 is issued in a second mode.

Different flash cycles are used for the hazard flashing in the first mode (first alarm) and the hazard flashing in the second mode (second alarm). The flash cycle for the second mode is shorter than that for the first mode. The first mode may steadily light the hazard lamp 95 instead of flashing. It is considered that shortening the flash cycle increases the frequency for the vicinity of the host vehicle to recognize the hazard flashing. The frequency of recognizing the hazard flashing is maintained relatively low immediately after the determination on the inability to drive. In contrast, the frequency of recognizing the hazard flashing is increased if no response returns from the driver afterward.

Suppose that the driver is unable to drive due to a sudden illness. In this case, the hazard avoidance process is highly likely to be performed to decelerate, stop, or pull over to the shoulder after the determination on the inability to drive. However, the driver's state returning to normal may result in not performing the hazard avoidance process. In considering such a case, the hazard flashing (also referred to as the first alarm) is performed in the mode that provides a relatively low frequency of recognition from the vicinity immediately after the determination on the inability to drive, whereas the hazard flashing (also referred to as the second alarm) is performed in the mode that provides a higher frequency of recognition from the vicinity than the first alarm after confirmation of no response from the driver. The first alarm can evoke a sense of danger around the host vehicle as soon as possible. The second alarm can report increased danger to vehicles around the host vehicle so as to take action to avoid the hazard. Presenting the alarm in two levels can produce an effect of avoiding disruption to vehicles around the host vehicle due to a sudden alarm and an effect of easily recognizing increased danger.

The first alarm and the second alarm may be embodied as follows. For example, the first alarm is issued to flash the hazard lamp 95 and keep the horn inactive immediately after the determination on the inability to drive. The second alarm is then issued to flash the hazard lamp 95 and activate the horn after confirmation of no response from the driver.

Third Embodiment

When the driver is determined to be unable to drive, a third embodiment chooses between (i) immediately flashing the hazard lamp 95 to issue an exterior alarm and (ii) confirming no response from the driver for a specified time and then flashing the hazard lamp 95 to issue an exterior alarm. Specifically, the embodiment determines which of the determination processes results in determining that the driver is unable to drive. The embodiment immediately flashes the hazard lamp 95 to issue an exterior alarm if a hazard rating is relatively high. The driver monitoring apparatus 50 awaits a lapse of specified time to confirm a response and then flashes the hazard lamp 95 to issue an exterior alarm if a hazard rating is relatively low.

FIG. 9 is a flowchart illustrating a process according to the embodiment. The driver monitoring apparatus 50 performs this process that replaces the process in FIG. 6. The mutually corresponding parts in FIGS. 9 and 6 are designated by the same reference symbols and a description is omitted for the purpose of illustration. In FIG. 9, S41 through S43 are newly added.

At S11 through S14 in FIG. 9, the driver monitoring apparatus 50 determines whether the driver is unable to drive. The processing proceeds to S41 if the driver is determined to be unable to drive. At S41, it is determined whether a driving hazard rating is relatively high under a state where the driver is determined to be unable to drive. It is determined which of the five determination processes (frame-out determination, postural imbalance determination, orientation imbalance determination, fluctuation determination, and white-of-the-eye determination) is a subject determination process that results in determining that the driver is unable to drive. It is then determined whether the subject determination deserves to cause a high driving hazard rating.

In detail, the five determination processes (frame-out determination, postural imbalance determination, orientation imbalance determination, fluctuation determination, and white-of-the-eye determination) each use different determination criteria to determine that the driver is unable to drive, based on the driver's state and behavior. Suppose that, of these determination processes, the frame-out determination process or the white-of-the-eye determination process determines that the driver is unable to drive. In this case, the driver can be assumed to be unable to view toward the front of the vehicle. This can determine that the driver is seriously ill and the driving hazard rating is high.

If S41 is YES, the processing proceeds to S15 and issues a directive on the hazard flashing. If S41 is NO, the processing skips S15 and ignores the hazard flashing.

After the driver is unable to drive, the processing may proceed to S42 after a lapse of specified time while no response returns. At S42, it is determined whether a driving hazard rating is relatively high (equal to S41) when the driver is determined to be unable to drive. If S42 is NO, the processing proceeds to S43 and issues a directive on the hazard flashing.

As above, when the driver is supposed to be unable to drive due to a sudden illness, the hazard avoidance process is highly likely to be performed to decelerate, stop, or pull over to the shoulder after the determination on the inability to drive. However, the hazard avoidance process may not be performed because the driver's state returns to normal. To solve this, an appropriate alarm process can be selected from the following. An alarm process at S15 (also referred to as a first control) is performed after S41 results in YES. This alarm process activates the hazard flashing immediately after the determination on the inability to drive (S14: YES). An alarm process at S43 (also referred to as a second control) is performed after S42 results in NO. This alarm process activates the hazard flashing after no response from the driver is confirmed (S17: NO). An appropriate alarm process can be performed in accordance with a hazard rating (degree of urgency) around the host vehicle. S41 or S42 is also referred to as a selection section that selects one of the first control and the second control.

It is favorable to predetermine several determination processes because the driver is supposed to exhibit various states and behaviors when the driver is unable to drive. The driver's disease condition (disease severity) depends on which of the determination processes determines the anomaly. There may be differences as to whether the driver can return to the normal state. An appropriate alarm process can be performed depending on which of the determination processes determines that the driver is unable to drive. In this case, the alarm process is selected to immediately activate the hazard flashing or to confirm no response from the driver and then activate the hazard flashing.

Of the determination processes (1) through (5) above, the frame-out determination process and the white-of-the-eye determination process determine that the driver is unable to view toward the front of the host vehicle. It is difficult to consider that normal driving disables the driver from viewing toward the front of the host vehicle. The driver is considered to be seriously ill (high disease severity). Immediate hazard flashing is favorable for hazard avoidance when the frame-out determination process or the white-of-the-eye determination process is performed to determine an anomaly.

Other Examples of Third Embodiment

The following conditions may be satisfied to select the alarm of immediately flashing the hazard lamp 95 or the alarm of confirming the driver's response and then flashing the hazard lamp 95 when the driver is determined to be unable to drive.

A vehicle speed of the vehicle 10 may be used to select the alarm of immediately flashing the hazard lamp 95 or the alarm of confirming the driver's response and then flashing the hazard lamp 95. Specifically, a vehicle speed threshold value (e.g., a specified speed ranging from 40 to 80 km/h) is predetermined. At S41 and S42 in FIG. 9, it is determined whether a speed at the determination on the driver's inability to drive is higher than or equal to the threshold value. If the vehicle speed is higher than or equal to the threshold value, the driver monitoring apparatus 50 immediately flashes the hazard lamp 95 when the driver is determined to be unable to drive (S15). If the vehicle speed is lower than the threshold value, the driver monitoring apparatus 50 confirms the driver's response and then flashes the hazard lamp 95 (S43).

Each determination process may determine a degree of driver's symptom (disease severity). Based on the degree of the symptom, the alarm may be selected to immediately flash the hazard lamp 95 or to confirm the driver's response and then flash the hazard lamp 95. Specifically, a symptom degree (disease severity) can be determined as a level based on the driver's postural imbalance angle, fluctuation amplitude, or white-of-the-eye degree. At S41 and S42 in FIG. 9, the processing determines whether the symptom reaches a serious level when the driver is determined to be unable to drive. If the symptom reaches the serious level, the hazard lamp 95 is flashed immediately when the driver is determined to be unable to drive (S15). If the symptom does not reach the serious level, the driver's response is confirmed and then the hazard lamp 95 is flashed (S43).

Mode setting is enabled for the hazard avoidance travel. A high mode and a low mode are predetermined. The high mode sets a counter-hazard level to high. The low mode sets a counter-hazard level to low. If the high mode is enabled, the hazard lamp 95 is immediately flashed when the driver is determined to be unable to drive. If the low mode is enabled, the driver's response is confirmed and then the hazard lamp 95 is flashed. The mode may be enabled manually by the driver or automatically by the vehicle. For example, the driver may be personally recognized and the mode may be automatically enabled according to the recognition result.

Other Embodiments

The above-mentioned embodiments may be modified as follows.

The embodiments perform the determination processes (1) through (5) to determine whether the driver is unable to drive. Instead of performing all the determination processes, some of the determination processes, including at least one of these, may be performed.

The hazard lamp 95 may not be used as an alarm annunciator. The hazard lamp 95 may be replaced by a horn apparatus, an audio apparatus, or an exterior display panel. The configuration just needs to issue an exterior alarm immediately when the driver is determined to be unable to drive.

The driver monitoring apparatus 50, not the behavior control apparatus 90, may perform a process (to activate the alarm annunciator) to flash the hazard lamp 95.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An in-vehicle control apparatus that performs monitoring of a state of a driver in a vehicle and controls behavior of the vehicle based on the monitoring to perform a hazard avoidance process, the in-vehicle control apparatus comprising:

an anomaly determination section that determines whether a driver is under driving inability state where the driver is unable to drive during travel of the vehicle, based on information on the monitoring of the state of the driver;

an alarm control section that activates, as an alarm annunciator, a hazard warning flashing lamp provided on an outside of the vehicle to issue an alarm outwardly from the vehicle immediately when the anomaly determination section determines that the driver is under driving inability state; and a hazard avoidance control section that, after the alarm annunciator starts the alarm outwardly from the vehicle, fails to perform the hazard avoidance process when the alarm is stopped by a manipulation of the driver, the manipulation being applied to a hazard switch that is provided inside of the vehicle to turn off the hazard warning flashing lamp and performs the hazard avoidance process when a specified time elapses under state where the alarm is not stopped since the starting of the alarm.

2. The in-vehicle control apparatus according to claim 1, wherein:

the alarm control section allows the alarm annunciator to issue a first alarm outwardly from the vehicle immediately when the anomaly determination section determines that the driver is under driving inability state; and the alarm control section allows the alarm annunciator to issue a second alarm outwardly from the vehicle when a specified time elapses since starting of the first alarm while confirming no response from the driver, the second alarm being issued in a mode more easily recognized around the vehicle than the first alarm.

3. The in-vehicle control apparatus according to claim 1, wherein the alarm control section includes:

a first control that allows the alarm annunciator to issue an alarm outwardly from the vehicle immediately when the anomaly determination section determines that the driver is under driving inability state;

a second control that allows the alarm annunciator to issue an alarm outwardly from the vehicle when confirming no response from the driver for a specified time after the anomaly determination section determines that the driver is under driving inability state; and a selection section that selects either the first control or the second control to issue an alarm.

4. The in-vehicle control apparatus according to claim 3, wherein:

the anomaly determination section includes a plurality of determinations to determine that the driver is under driving inability state according to different determination criteria based on a state and behavior of the driver; and the selection section selects either the first control or the second control to issue an alarm, depending on which of the determinations determines that the driver is in driving inability state.

5. The in-vehicle control apparatus according to claim 4, wherein:

the plurality of determinations include a determination that determines that the driver is under viewing inability state where the driver is unable to view toward a front of the vehicle; and the selection section allows the first control to issue an alarm when the driver is determined to be under driving inability state by the determination determining that the driver is under viewing inability state, among the plurality of determinations.

6. The in-vehicle control apparatus according to claim 3, wherein the selection section selects either the first control or the second control to issue an alarm, based on a vehicle speed of the vehicle.

7. The in-vehicle control apparatus according to claim 1, wherein:

when determining that the driver exhibits a symptom of an abnormal state based on information on the monitoring of the state of the driver, the anomaly determination section starts incrementing a counter value of an anomaly counter; and when the counter value reaches a specified threshold value, the anomaly determination section determines that the driver is under driving inability state.

8. The in-vehicle control apparatus according to claim 1, wherein:

the alarm control section activates, as an additional alarm annunciator in addition to the hazard warning flashing lamp, a hazard display mark provided inside of the vehicle to issue an additional alarm inside the vehicle immediately when the anomaly determination section determines that the driver is under driving inability state; and when the manipulation of the driver is applied to the hazard switch, the alarm from the hazard warning flashing lamp and the additional alarm from the hazard display mark are stopped.

\* \* \* \* \*